Figures 1, 2:
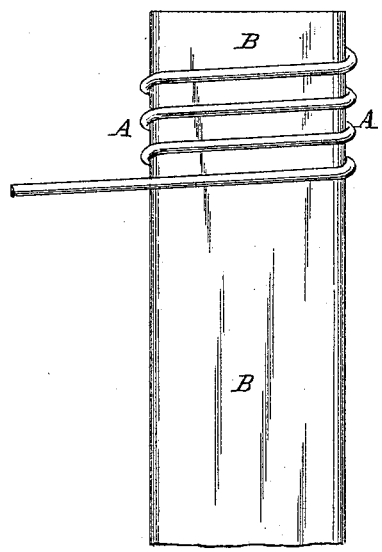

(No Model.)

G. KELLY.
METHOD OF MAKING FLAT COILED SPRINGS.

No. 397,861. Patented Feb. 12, 1889.

ATTEST:
Henry Watson
M. H. Holmes

INVENTOR:
George Kelly,
by Robert Burns
Attorney.

UNITED STATES PATENT OFFICE.

GEORGE KELLY, OF CHICAGO, ILLINOIS.

METHOD OF MAKING FLAT COILED SPRINGS.

SPECIFICATION forming part of Letters Patent No. 397,861, dated February 12, 1889.

Application filed June 2, 1888. Serial No. 275,840. (No model.)

*To all whom it may concern:*

Be it known that I, GEORGE KELLY, a citizen of the United States, residing at Chicago, in the county of Cook and State of Illinois, have invented a certain new and useful Improvement in the Art of Making Flat Coiled Springs; and I do hereby declare the following to be a full, clear, and exact description of the same, reference being had to the accompanying drawings, forming a part of this specification, and in which—

Figure 1 is a detail elevation of a flattened coiling-mandrel with a portion of the wire spring coiled thereon; and Fig. 2, a detail section of a pair of jaws for setting the coils after being wound, the mandrel being shown in transverse section.

To enable others skilled in the art to which my invention appertains to make and use the same, I will now proceed to more fully describe the means employed and the mode of operation of the same.

In the method heretofore employed in the manufacture of flat coiled springs the wire was first wound upon a flat mandrel of the required cross-section into a flattened spiral spring of the required size and form, which, while still upon the mandrel, was heated, so as to draw the temper of the metal and enable the spirals to become ".set" in proper relative position around the mandrel, after which the spring was again heated and tempered in the ordinary manner to form a completed spring. Such mode of manufacture was necessarily slow, laborious, and expensive.

As distinguished from the above, my invention consists in winding the spring-wire into a spiral coil, A, upon a flattened mandrel, B, as indicated in Fig. 1, and then submitting the coil while still upon the mandrel to a "setting" operation, that is effected by means of a pair of pressure-jaws, C D, as indicated in Fig. 2, to set to a uniform size and proportion the series of spirals composing the spring, and by such means produce in a quick, cheap, and efficient manner flattened spiral springs having a very uniform and regular shape without the aid of heat.

In use the jaws C D may be the fixed and movable heads of a vise, power-press, or drop-hammer, or the one an anvil and the other a hammer, it being found by practical experiment that either of such appliances will give good results.

Having thus fully described my said invention, what I claim as new, and desire to secure by Letters Patent, is—

The herein-described improvement in the art of making flattened spiral springs, the same consisting in winding the spirals upon a flat mandrel and then setting the same in their proper shape by pressure between a pair of pressure-imparting heads while such spirals are still upon the mandrel, substantially as set forth.

In testimony whereof witness my hand this 31st day of May, 1888.

GEORGE KELLY.

In presence of—
 ROBERT BURNS,
 HENRY WATSON.